United States Patent
Sano et al.

(10) Patent No.: US 8,212,972 B2
(45) Date of Patent: Jul. 3, 2012

(54) DISPLAY DEVICE WITH MULTILAYER BODY HAVING AT LEAST ONE LAYER OF A GLUING AGENT

(75) Inventors: Yasushi Sano, Yokohama (JP); Kiyoshi Sentou, Sakura (JP); Hideaki Nakatsuka, Mutsuzawa (JP); Hiroaki Miwa, Yokohama (JP); Risa Takahashi, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 409 days.

(21) Appl. No.: 12/490,522

(22) Filed: Jun. 24, 2009

(65) Prior Publication Data

US 2009/0322999 A1   Dec. 31, 2009

(30) Foreign Application Priority Data

Jun. 25, 2008   (JP) ................................. 2008-165263

(51) Int. Cl.
*G02F 1/1333* (2006.01)
*G02F 1/1337* (2006.01)
*C09K 19/00* (2006.01)

(52) U.S. Cl. ............................. 349/96; 349/122; 428/1.5

(58) Field of Classification Search .................... 349/96, 349/122; 128/1.5
See application file for complete search history.

(56) References Cited

U.S. PATENT DOCUMENTS

| 5,880,800 A | * | 3/1999 | Mikura et al. ................. 349/122 |
| 2003/0098931 A1 | * | 5/2003 | Saiki et al. ........................ 349/1 |
| 2006/0082708 A1 | * | 4/2006 | Nagase et al. ................. 349/124 |

FOREIGN PATENT DOCUMENTS

| JP | 2004-240455 | 8/2004 |
| JP | 2004-354557 | 12/2004 |
| JP | 2005-017704 | 1/2005 |
| JP | 2005-189571 | 7/2005 |
| JP | 2007-178758 | 7/2007 |
| JP | 2008-116788 | 5/2008 |
| JP | 2008-158251 | 7/2008 |

* cited by examiner

*Primary Examiner* — Michael Caley
(74) *Attorney, Agent, or Firm* — Antonelli, Terry, Stout & Kraus, LLP.

(57) ABSTRACT

An object of the present invention is to provide a display device where a display panel and a transparent cover which are pasted together can be separated from each other without breaking the liquid crystal display panel and the transparent cover. The present invention provides a display device having: a liquid crystal display panel having a liquid crystal layer sandwiched between a first substrate and a second substrate which is provided on the viewer side relative to the first substrate; a polarizing plate provided on the above described liquid crystal display panel on the above described viewer side; a viscous film pasted on the viewer side relative to the above described polarizing plate; and a transparent cover pasted on the viewer side relative to the above described viscous film, wherein the above described viscous film is made up of a multilayer body of gluing agents.

14 Claims, 4 Drawing Sheets ratio of area where display is inconsistent to area of effective display film thickness of adhesive layer (mm)

DISPLAY DEVICE WITH MULTILAYER BODY HAVING AT LEAST ONE LAYER OF A GLUING AGENT

The present application claims priority over Japanese Application JP 2008-165263, filed on Jun. 25, 2008, the contents of which are hereby incorporated into this application by reference.

BACKGROUND OF THE INVENTION (1) Field of the Invention

The present invention relates to a display device where a transparent cover is pasted to the surface of a display panel via a viscous film.

(2) Related Art Statement

Liquid crystal display devices having a liquid crystal display panel, for example, are known as display devices. In many cases, a transparent cover, such as of an acryl resin, is provided on the viewer side (front side) of these liquid crystal display panels. This transparent cover functions as a protective cover plate. However, this transparent cover is provided at a predetermined distance from the liquid crystal display panel, and therefore, an air layer intervenes between the transparent cover and the liquid crystal display panel. Thus, unnecessary reflection occurs in the interface with this air layer due to the difference in the index of refraction, which becomes a factor of lowering the contrast of the display.

In order to solve this problem, a technology for pasting a transparent cover to the surface of the liquid crystal display panel using an adhesive or a viscous film has been proposed. FIG. 3 is a cross sectional diagram showing the structure of a conventional liquid crystal display device.

In FIG. 3, a liquid crystal display panel PNL has a structure where a first substrate 1 and a second substrate 2 are pasted together with a sealing material 3 in between so that a liquid crystal layer 6 is sandwiched between the first substrate 1 and the second substrate 2. In addition, a lower polarizing plate 4 and an upper polarizing plate 5 are provided on the first substrate 1 on the side opposite to the liquid crystal layer 6 and on the second substrate 2 on the side opposite to the liquid crystal layer 2, respectively.

A transparent cover 7 is pasted to the surface of this liquid crystal display panel PNL on the viewer side with an adhesive or a viscous film 12 in between. In addition, when the used adhesive or viscous film 12 has an index of refraction that is close to that of the transparent cover 7, unnecessary reflection can be prevented in the interface due to the difference in the index of refraction because no air layer intervenes, and thus, the contrast of the display can be increased.

In addition to the conventional structure shown in FIG. 3, the following Patent Document 1 can be cited as an example of the prior art relating to the present invention.

[Patent Document 1] Japanese Unexamined Patent Publication 2007-178758

SUMMARY OF THE INVENTION

Problem to be Solved by the Invention

According to Patent Document 1, the adhesive provided between the liquid crystal display panel PNL and the transparent cover 7 has a thickness of 0.05 mm to 0.1 mm in the conventional structure similar to that shown in FIG. 3.

In the case where the adhesive layer is thin, the adhesive layer changes in form as a result of moisture absorption in a reliability test, which is performed in a high temperature high moisture environment, and furthermore, such a problem arises that the liquid crystal display panel changes form, thereby causing inconsistent display. The film thickness, which can prevent inconsistent display, is approximately 0.09 mm or greater.

FIG. 8 is a graph showing the film thickness of the adhesive layer (mm) along the lateral axis and the ratio of the area where the display is inconsistent to the area of effective display in a liquid crystal display panel PNL along the longitudinal axis, and it can be seen from this that the film thickness of the adhesive layer which does not cause inconsistent display is approximately 0.09 mm or greater.

In addition, as shown in FIG. 8, the thicker the adhesive layer is, the better, but it is desirable for the thickness to be set within such a range as to not deviate from the dimensions, which make the assembly of a device on which the display device is mounted (for example, a portable phone) possible, and thus, the upper limit of the film thickness of the adhesive is approximately 1 mm. Taking the above into consideration, it is desirable for the thickness of the adhesive layer to be 0.09 mm to 1 mm.

However, approximately 0.1 mm is the limit of the thickness in the prior art, where an adhesive is used as described above, and it is difficult to make the film as thick as approximately 1 mm.

Meanwhile, it is easy to change the thickness of the viscous films by changing the thickness of application to a support body on which the film is formed during the manufacturing process, and viscous films having a thickness of approximately 1 mm are sold as products. It is possible to meet the thickness requirement of the connecting layer by using these viscous films.

In the case where floating dust (foreign substance) generated by workers and apparatuses enters between the liquid crystal display panel PNL or the transparent cover 7 and the viscous film during the manufacturing process where a liquid crystal display panel PNL and a transparent cover 7 are pasted together with a viscous film, the brightness changes in the portion where a foreign substance is located, which becomes a defect in the display. As a result of processing, values are added to the liquid crystal display panels PNL and the transparent covers 7, respectively. Therefore, in the case where there is a defect in the display due to a foreign substance, it is desired to separate the liquid crystal display panel PNL and the transparent cover 7 from each other so that they can be restored and reused.

When a liquid crystal display panel PNL and a transparent cover 7 are attempted to be separated from each other forcibly by applying force, the liquid crystal display panel PNL or the transparent cover 7 is broken and becomes a defect because the adhesiveness of the adhesive film is as strong as approximately 100 N/cm2 immediately after being pasted. Therefore, liquid crystal display devices using a viscous film are disposed of as waste without being restored according to the prior art.

In addition, current liquid display panels PNL have a thickness of approximately 0.2 mm in such a state that the first substrate 1 and the second substrate 2 are pasted via a sealing material 3, and a problem arises in that they cannot be separated forcefully without being broken.

The problems may arise not only with liquid crystal display devices using a liquid crystal display panel display, but also with other devices using a display panel of another type.

An object of the present invention is to provide a display device where the display panel and the transparent cover, which are pasted together, can be separated without the liquid crystal display panel or the transparent cover being broken.

Means for Solving Problem

The above described object can be achieved by an embodiment of the present invention which provides a display device where the viscous film for pasting the transparent cover to the display panel is a material where two layers of gluing agents are layered on top of each other.

The above described object can also be achieved by another embodiment of the present invention which provides a display device where the viscous film for pasting the transparent cover to the display panel is a material where a gluing agent and a resin layer are layered on top of each other.

The following can be examples of the structure according to the present invention.

(1) The display device according to the present invention is, for example, a display device having: a liquid crystal display panel having a liquid crystal layer sandwiched between a first substrate and a second substrate which is provided on the viewer side relative to the first substrate; a polarizing plate provided on the above described liquid crystal display panel on the above described viewer side; a gluing agent pasted on the viewer side relative to the above described polarizing plate; and a transparent cover pasted on the viewer side relative to the above described gluing agent, and is characterized in that the above described gluing agent is made up of a multilayer body having a gluing agent pasted on the polarizing plate side and a gluing agent pasted on the transparent cover side.

(2) The display device according to the present invention is, for example, a display device having: a liquid crystal display panel having a liquid crystal layer sandwiched between a first substrate and a second substrate which is provided on the viewer side relative to the first substrate; a polarizing plate provided on the above described liquid crystal display panel on the above described viewer side; a viscous film pasted on the viewer side relative to the above described polarizing plate; and a transparent cover pasted on the viewer side relative to the above described viscous film, and is characterized in that the above described viscous film is made up of a multilayer body of gluing agents.

(3) The display device according to the present invention is, for example, characterized in that the above described viscous film is formed of two layers in (2).

(4) The display device according to the present invention is, for example, characterized in that the above described viscous film is made of a first gluing agent pasted to the above described polarizing plate and a second gluing agent pasted to the above described transparent cover, and the strength in the adhesion between the above described polarizing plate and the first gluing agent and the strength in the adhesion between the above described transparent cover and the second gluing agent are higher than the strength in the adhesion in the interface between layers of the above described first gluing agent and the above described second gluing agent in (2) or (3).

(5) The display device according to the present invention is, for example, characterized in that the above described first adhesive and the above described second adhesive are in such a state as to be separable between the above described first gluing agent and the above described second gluing agent in (4).

(6) The display device according to the present invention is, for example, characterized in that the thickness of the above described viscous film is in a range from 0.1 mm to 1 mm in any of (2), (3) and (4).

(7) The display device according to the present invention is, for example, characterized in that the above described viscous film has a transmittance of visible light of 90% or higher in any of (2), (3) and (4).

(8) The display device according to the present invention is, for example, characterized in that the materials of the above described first gluing agent and the above described second gluing agent which form the above described viscous film are acryl based oligomers or acryl based polymers in any of (2), (3) and (4).

(9) The display device according to the present invention is, for example, characterized in that the above described transparent cover functions as a touch panel in any of (1) to (8).

(10) The display device according to the present invention is, for example, a display device having: a liquid crystal display panel having a liquid crystal layer sandwiched between a first substrate and a second substrate which is provided on the viewer side relative to the above described first substrate; a polarizing plate provided on the above described liquid crystal display panel on the above described viewer side; a viscous film pasted on the viewer side relative to the above described polarizing plate; and a transparent cover pasted on the viewer side relative to the above described viscous film, and is characterized in that the above described viscous film is a multilayer material of a gluing agent and a resin layer.

(11) The display device according to the present invention is, for example, characterized in that the above described multilayer material is formed of three layers in (10).

(12) The display device according to the present invention is, for example, characterized in that the thickness of the above described viscous film is in a range from 0.1 mm to 1 mm in (10) or (11).

(13) The display device according to the present invention is, for example, characterized in that the above described viscous film has a transmittance of visible light of 90% or higher in any of (10) to (12).

(14) The display device according to the present invention is, for example, characterized in that the above described transparent cover functions as a touch panel in any of (10) to (13).

(15) The display device according to the present invention is, for example, characterized in that the material of the above described gluing agent which forms the above described viscous film is an acryl based oligomer or an acryl based polymer in any of (11) to (14).

(16) The display device according to the present invention is, for example, characterized in that the material of the above described resin layer which forms the above described viscous film is made of polyethylene terephthalate or a cycloolefin polymer in any of (10) to (15).

(17) The manufacturing method for a display device according to the present invention is, for example, the manufacturing method for the display in any of (1) to (16), and characterized in that the above described transparent cover and the above described liquid crystal display panel are separated from each other and reused using a means for holding the above described display device flat while applying heat and a means for applying a load linearly from one side of the above described viscous film toward the other side.

(18) The display device according to the present invention is, for example, a display device characterized in that a gluing agent remains on the surface of the above described separated transparent cover and liquid crystal display panel in the manufacturing method in (17).

Here, the above described structures are merely examples, and appropriate modifications are possible, provided that they are within such a scope as not to deviate from the technical idea of the present invention. In addition, examples of structures of the invention other than the above described structures will become more clear from the descriptions in the entirety of the present specification, as well as the drawings.

Effects of the Invention

Typical effects of the present invention are as follows.

According to the present invention, a multilayer adhesive material or viscous film is used to paste the display panel and the transparent cover together, and therefore, the weak gluing agents are separated from each other when an external force is applied, so that the display panel and the transparent cover can be separated.

In addition, according to the present invention, a viscous sheet where a gluing agent and a resin layer are layered on top of each other is used to paste a transparent cover to a display panel, and the gluing agent and the resin layer, which have weak adhesion, are separated when an external force is applied, so that the display panel and the transparent cover can be separated.

Other effects of the present invention will become more clear from the descriptions in the entirety of the specification.

EXPLANATION OF SYMBOLS 1, 2 . . . substrate; 3 . . . sealing material; 4, 5 . . . polarizing plate; 6 . . . liquid crystal layer; 7 . . . transparent cover; 8, 9 . . . gluing agent; 10 . . . resin layer; 11 . . . linear load; 12 . . . adhesive or viscous film; 13 . . . display region; 14 . . . drive circuit; 15 . . . flexible wiring board

DETAILED DESCRIPTION OF THE INVENTION

The embodiments of the present invention are described below in reference to the drawings. Here, the same symbols are symbols to components that are the same or similar in the embodiments and drawings, and the descriptions thereof are not repeated.

First Embodiment

Figure 1:
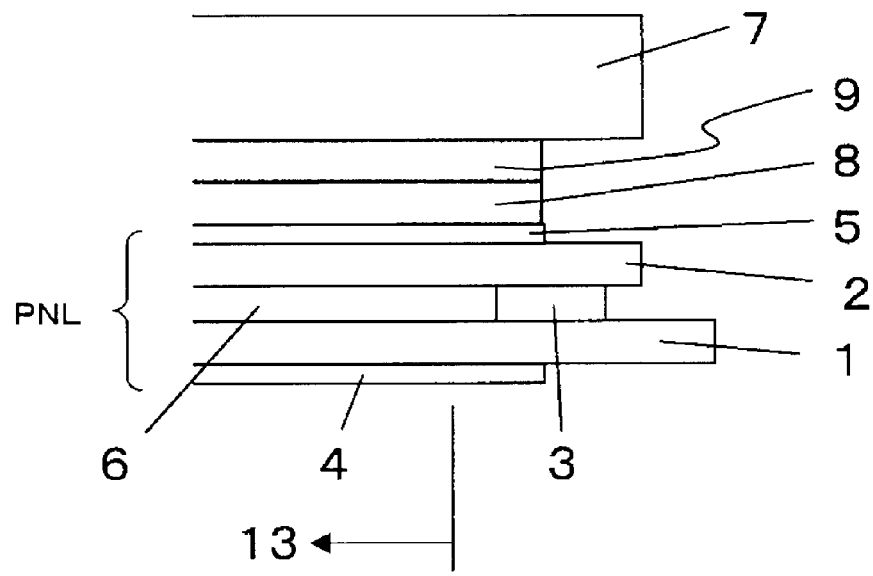
FIG. 1 is a cross sectional diagram showing the display device according to the first embodiment of the present invention.
Figure 2:
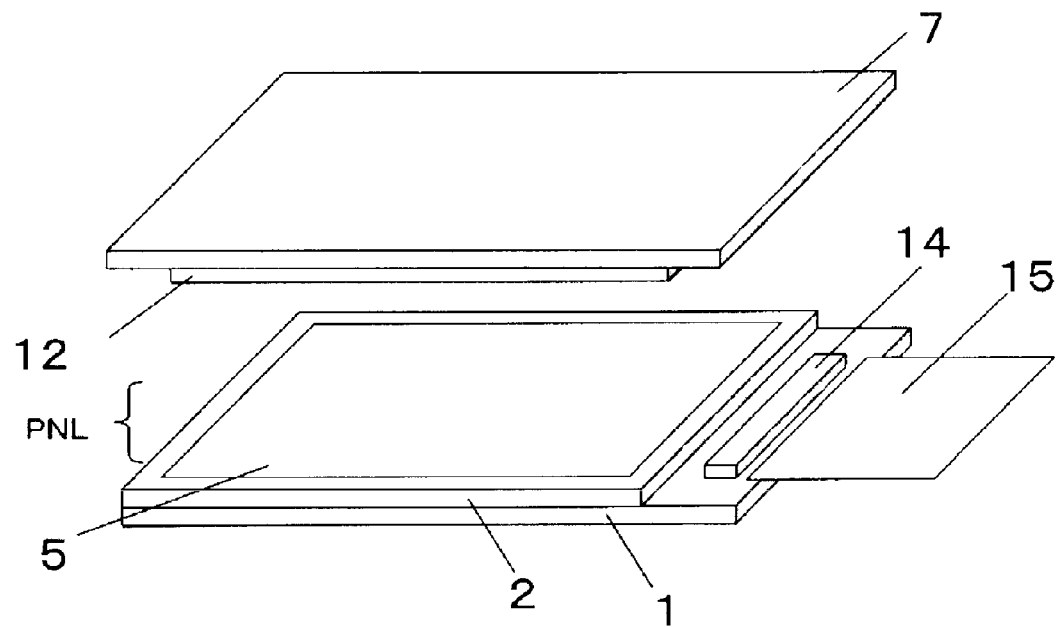
FIG. 2 is a perspective diagram showing the manner in which a display panel and a transparent cover are pasted together according of the present invention.
Figure 3:
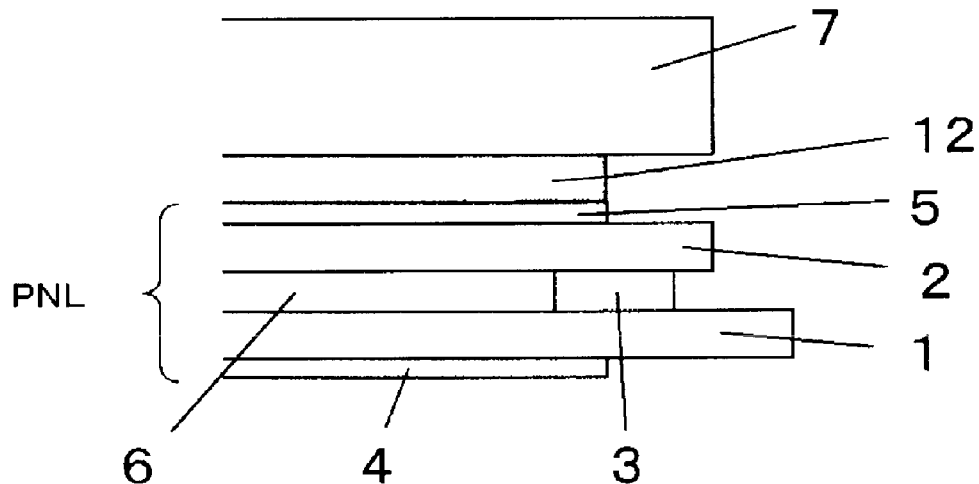
FIG. 3 is a cross sectional diagram showing the structure of a conventional display device.

FIG. 1 is a cross sectional diagram showing the display device according to the first embodiment of the present invention. FIG. 2 is a perspective diagram showing the manner in which a display panel and a transparent cover are pasted together according to the present invention. FIG. 3 is a cross sectional diagram showing the structure of a conventional display device.

First, the structure of the display device shown in FIG. 3 is described, so that the structure of the display device according to the present invention can be more easily understood. FIG. 3 shows a case where a liquid crystal display panel is used as the display panel. In FIG. 3, the liquid crystal display panel PNL has an insulating and transparent first substrate 1 and second substrate 2, which are formed of glass, for example. Thus, the first substrate 1 and the second substrate 2 are pasted together with a sealing material 3 in between.

A liquid crystal layer 6 is sandwiched between the first substrate 1 and the second substrate 2. The sealing material 3 is provided in a peripheral portion, outside the display region 13 in the liquid crystal display panel, and surrounds the liquid crystal layer 6. In FIG. 3, the second substrate 2 side is the viewer side (front side) in the arrangement. Though in the present embodiment the first substrate 1 and the second substrate 2 both have a thickness of 0.3 mm and the liquid crystal layer 6 has a thickness of 4 μm, the thickness is not limited to this.

A number of independently driven pixels are arranged in a matrix in the display region 13 of the liquid crystal display panel PNL. A number of scan signal lines, a number of video signal lines which cross the number of scan signal lines, a number of switching elements made of thin film transistors, and a number of pixel electrodes are formed on the surface of the first substrate 1 on the liquid crystal layer 6 side. In addition, one or a number of counter electrodes are formed on the surface of the first substrate 1 or the second substrate 2 on the liquid crystal layer 6 side. The electrical field generated as a result of the difference in potential between the pixel electrodes and the counter electrode(s) drives the liquid crystal molecules in the liquid crystal layer 6, so that an image is displayed in the display region 13.

In addition, the liquid crystal display panel has a polarizing plate 4 provided on the surface of the first substrate 1 on the side opposite to the liquid crystal layer 6, and a polarizing plate 5 provided on the surface of the second substrate 2 on the side opposite to the liquid crystal layer 6. In the present embodiment, the polarizing plate 4 and the polarizing plate 5 both have a thickness of 0.15 mm. However, the thickness is not limited to this.

A transparent cover 7 is pasted to the surface of the liquid crystal display panel on the viewer side with a viscous film 12 in between. As shown in FIG. 2, for example, the viscous film 12 is pasted to the transparent cover 7 on the rear side, and then the transparent cover is pasted to the liquid crystal display panel. It is desirable for the thickness of the viscous film 12 to be in a range from 0.09 mm to 1 mm in the portion between the transparent cover 7 and the polarizing plate 2. In the present embodiment, for example, the thickness is 0.2 mm. A material having little difference in the index of refraction with the transparent cover 7 (it is desirable for the difference in the index of refraction to be 0.2 or less), for example a gluing agent made of an acryl based oligomer or polymer, can be used for the viscous film 12, so that it becomes possible to reduce unnecessary reflection in the interface.

The transparent cover 7 is formed of a transparent material, such as glass or an acryl resin, and functions as a protective cover panel. It is desirable for the thickness to be 0.5 mm to 2.5 mm. In the present embodiment, for example, the thickness is 1.0 mm.

As shown in FIG. 2, the liquid crystal display panel has a region where the first substrate 1 sticks out from over the second substrate 2 on at least one side, and a drive circuit 14 formed of a semiconductor chip is mounted in this protruding region. In addition, a terminal for connection to the outside is formed in the protruding portion, so that a flexible wiring board 15 can be connected through this terminal.

Though in FIG. 3, the first substrate 1 sticks out from over the second substrate 2, the structure is not limited to this, and the location of the end portion of the first substrate and the end portion of the second substrate 2 may be approximately the same along the sides other than the side along which the drive circuit 14 or flexible wiring board 15 is mounted. This is the same in the other embodiments.

The viscous film 12 has a strength of as high as approximately 100 N/cm2 in adhesion immediately after the transparent cover 7 and the liquid crystal display panel are pasted together. Therefore, when the transparent cover 7 is separated from a defective liquid crystal display panel during the manufacturing process in order to be restored and reused, a problem may arise, such that the liquid crystal display panel or the transparent cover 7 breaks, if the liquid crystal display panel and the transparent cover are forcefully separated by applying a force.

Thus, as shown in FIG. 1, the embodiment of the present invention is characterized in that the viscous film for pasting the transparent cover 7 and the liquid crystal display panel together is a multilayer viscous film made up of a first gluing agent 8 pasted on the liquid crystal display panel PNL side and a second gluing agent 9 pasted on the transparent cover 7 side.

Figure 4:
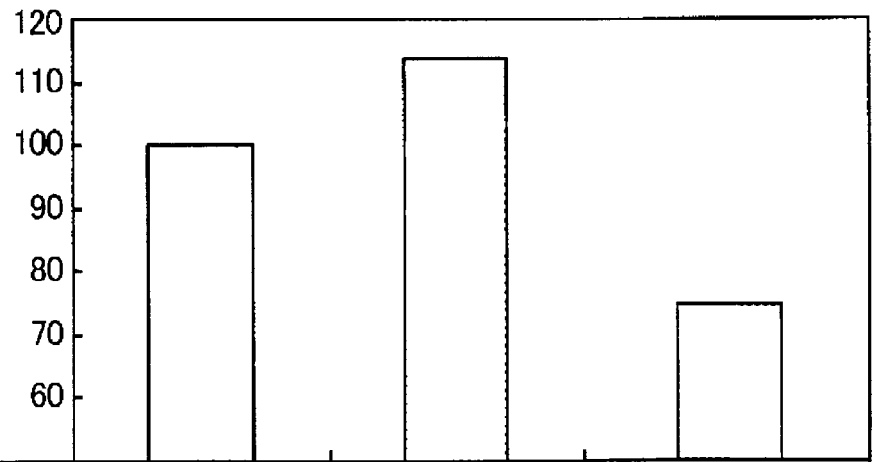
FIG. 4 is a graph comparing the peel strength of various gluing agents.

FIG. 4 is a graph showing the results of examination of the strength in adhesion through peeling tests in the case where the adhesive film between the transparent cover 7 and the liquid crystal display panel PNL is a single layer viscous film (viscous film A, viscous film B) and the multilayer viscous film of the present embodiment.

In the case where the transparent cover 7 (substrate A) and the liquid crystal display panel PNL (substrate B) are pasted together with a viscous film A pasted on the substrate A side, the strength in adhesion between the two is approximately 100 N/cm2. In the case where the transparent cover 7 (substrate A) and the liquid crystal display panel PNL (substrate B) are pasted together with a viscous film B pasted on the substrate A side, the strength in adhesion between the two is approximately 110 N/cm2.

Meanwhile, in the case where the transparent cover 7 (substrate A) and the liquid crystal display panel PNL (substrate B) are pasted together with a viscous film A pasted on the substrate A side and a viscous film B pasted on the substrate B side, the strength in adhesion between the two is approximately 75 N/cm2.

It is evident from the above that multilayer viscous films have low strength in adhesion in the interface between the layers in comparison with any single layer viscous films.

This is considered to be because of the phenomenon described below. That is to say, adhesives are flexible solids having a rubber hardness of approximately 10, and thus, the adhesiveness increases when they are pressed against the object to which it is to adhere and the area of contact increases. Accordingly, in the case where they are pasted to a rigid body, such as a transparent cover 7 or a liquid crystal display panel PNL, they are pressed sufficiently for the area of adhesion to increase, and they are pasted with high strength in adhesion. However, when adhesives are layered on top of each other, they are not sufficiently pressed against each other, even when they make contact with each other, because they are both flexible materials, and thus, the area for adhesion does not increase, and the strength in adhesion cannot be considered to increase. As a result, multilayer viscous films have such effects as to make separation of the transparent cover 7 and the liquid crystal display panel PNL easy.

Figure 5:
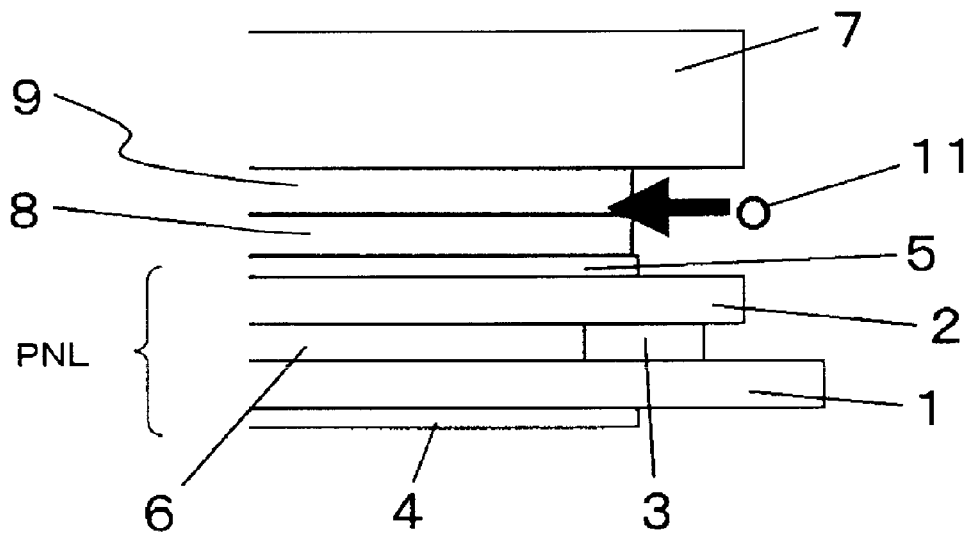
FIG. 5 is a diagram schematically illustrating a method for separating the transparent cover and the liquid crystal display panel.
Figure 6:
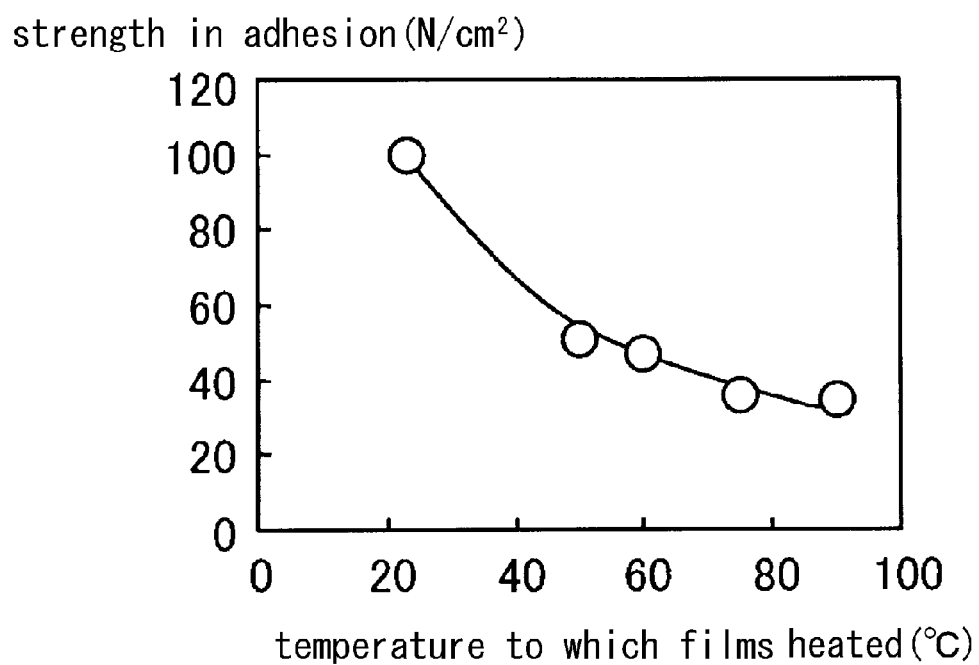
FIG. 6 is a graph showing the relationship between the temperature to which the gluing agent is heated and the strength in the adhesiveness of the gluing material.

A method for separating the transparent cover 7 and the liquid crystal display panel PNL in the above described display device is described below. As shown in FIG. 5, which corresponds to FIG. 1, a linear load 11 of a thread made of nylon or a polyvinylidene fluoride resin applies an external force from one side of the multilayer viscous film toward the other side, so that the first gluing agent 8 and the second gluing agent 9 peel from each other, and thus, the transparent cover 7 and the liquid crystal display panel PNL are separated from each other. Here, nylon thread is used for the linear load 11, and the diameter of the linear load 11 is approximately 0.05 mm to 1.0 mm (preferably 0.2 mm). This is because it is desirable for the linear load to be determined by the thickness of the multilayer viscous film in which the layers are to be separated. In this case, the viscous film has such properties that the strength in adhesion lowers when heat is applied, and therefore, the entire display device may be heated before and during application of an external force, so that the strength in adhesion between the layers in the viscous film lowers when the transparent cover 7 and the liquid crystal display panel PNL are separated from each other. FIG. 6 is a graph showing the dependency of the strength in adhesion when the viscous films are heated, and the lateral axis is the temperature to which the viscous films are heated (° C.), while the longitudinal axis is the strength in adhesion (N/cm2). The temperature at the time of separation is determined by the heatproof temperature of the respective members of the transparent cover 7 and the liquid crystal display panel PNL, and it is desirable for it to be in a range from 50° C. to 80° C. (preferably 70° C.). As for the heating means, it is desirable to use a hot plate, an infrared ray heater or a hot air circulating oven, for example. Using this separation method, the first gluing agent and the second gluing agent can be separated from each other without breaking the transparent cover 7 and the liquid crystal display panel PNL.

Second Embodiment

Figure 7:
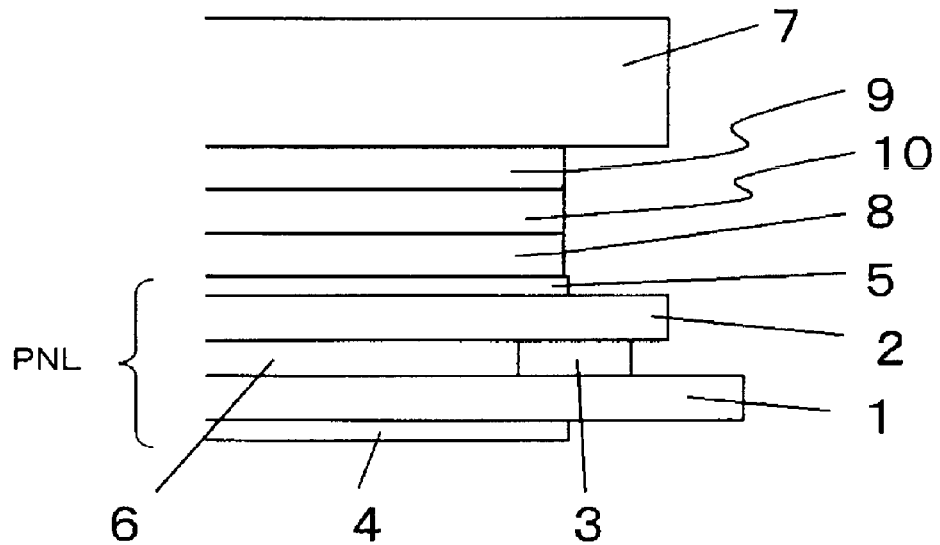
FIG. 7 is a cross sectional diagram showing the display device according to the second embodiment of the present invention.
Figure 8:
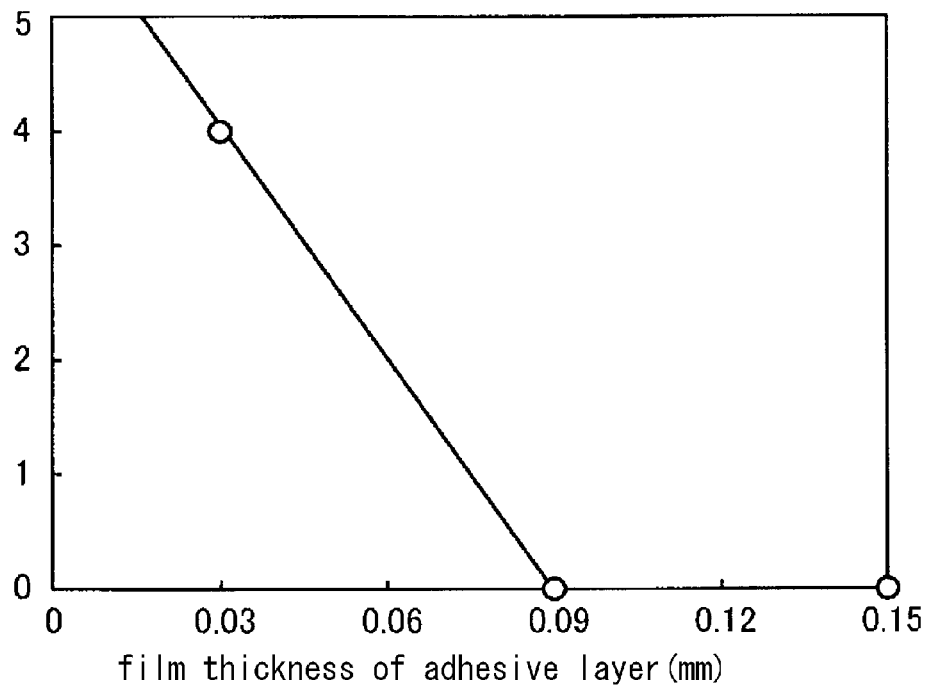
FIG. 8 is a graph showing the relationship between the film thickness of the adhesive layer and inconsistency in the display.

FIG. 7 is a cross sectional diagram showing the display device according to the second embodiment of the present invention, and corresponds to FIG. 1.

The structure in FIG. 7 is different from that in FIG. 1 in that a multilayer viscous film where a gluing agent 10 made of an acryl based oligomer or polymer between a viscous film 9 made of polyethylene terephthalate or a cycloolefin polymer provided on the surface of the transparent cover 7 on the liquid crystal panel PNL side, and a viscous film 8 provided on the surface of the liquid crystal panel PNL on the transparent cover 7 side is provided.

The gluing agent 10 in this multilayer viscous film is applied on the two surfaces of the resin layers, and the strength in adhesion can be made weak. Thus, the viscous film in which the gluing agent 10 and the resin layers are layered has such effects that the transparent cover 7 and the liquid crystal display panel PNL are easy to separate from each other.

When the transparent cover 7 and the liquid crystal display panel PNL in the display device shown in FIG. 7 are separated under the same conditions as in the first embodiment, they can be separated from each other without damaging the transparent cover 7 and the liquid crystal display panel, as in the first embodiment.

Though the above described embodiments are for liquid crystal display devices, the present invention can be applied to other display devices, and not limited to liquid crystal display panels.

What is claimed is:

1. A display device comprising: a liquid crystal display panel having a liquid crystal layer sandwiched between a first substrate and a second substrate which is provided on a viewer side relative to said first substrate; a polarizing plate provided on said liquid crystal display panel on said viewer side; a viscous film pasted on said viewer side relative to said polarizing plate; and a transparent cover pasted on said viewer side relative to said viscous film, characterized in that said viscous film is made up of a multilayer body of gluing agents formed of two layers including a first layer of a first gluing agent pasted to said polarizing plate and a second layer of a second gluing agent pasted to said transparent cover, said first layer and said second layer being adjacent one another, and the strength in the adhesion between said polarizing plate and said first layer of said first gluing agent and the strength in the adhesion between said transparent cover and said second layer of said second gluing agent are higher than the strength in the adhesion in the interface between said first layer of said first gluing agent and said second layer of said second gluing agent.

2. The display device according to claim 1, characterized in that the strength of adhesion between the first and second layers enables separation between said first layer of said first gluing agent and said second layer of said second gluing agent.

3. The display device according to claim 1, characterized in that the thickness of said viscous film is in a range from 0.1 mm to 1 mm.

4. The display device according to claim 1, characterized in that said viscous film has a transmittance of visible light of 90% or higher.

5. The display device according to claim 1, characterized in that the materials of said first gluing agent and said second gluing agent which form said viscous film are acryl based oligomers or acryl based polymers.

6. The display device according to claim 1, characterized in that said transparent cover functions as a touch panel.

7. The display device according to claim 1, characterized in that a material of said first layer of said first gluing agent and a material of said second layer of second gluing agent is the same material.

8. The display device according to claim 1, characterized in that said viscous film enables separation of said polarizing plate provided on said liquid crystal panel from said transparent cover without breakage and thereby enabling reuse.

9. A display device, comprising: a liquid crystal display panel having a liquid crystal layer sandwiched between a first substrate and a second substrate which is provided on the viewer side relative to said first substrate; a polarizing plate provided on said liquid crystal display panel on said viewer side; a viscous film pasted on the viewer side relative to said polarizing plate; and a transparent cover pasted on the viewer side relative to said viscous film, characterized in that said viscous film is a multilayer material of three layers of a layer of a gluing agent and of first and second resin layers including a first resin layer pasted to said polarizing plate, a second resin layer pasted to said transparent cover, and said layer of said gluing agent formed between said first resin layer and said second resin layer, wherein the strength in the adhesion between said polarizing plate and said first resin layer and the strength in the adhesion between said transparent cover and said second resin layer are higher than the strength in the adhesion between said first resin layer and said layer of said gluing agent and the strength in the adhesion between said second resin layer and said layer of said gluing agent.

10. The display device according to claim 9, characterized in that the thickness of said viscous film is in a range from 0.1 mm to 1 mm.

11. The display device according to claim 9, characterized in that said viscous film has a transmittance of visible light of 90% or higher.

12. The display device according to claim 9, characterized in that said transparent cover functions as a touch panel.

13. The display device according to claim 9, characterized in that the material of said layer of said gluing agent which forms said viscous film is an acryl based oligomer or an acryl based polymer, and the material of said first and second resin layers which form said viscous film is made of polyethylene terephthalate or a cycloolefin polymer.

14. The display device according to claim 9, characterized in that said viscous film enables separation of said polarizing plate provided on said liquid crystal panel from said transparent cover without breakage and thereby enabling reuse.

* * * * *